(12) United States Patent
Wohlert

(10) Patent No.: US 10,313,631 B2
(45) Date of Patent: *Jun. 4, 2019

(54) SYSTEM AND METHOD TO ENABLE LAYERED VIDEO MESSAGING

(71) Applicant: AT&T Intellectual Property I, L.P., Atlanta, GA (US)

(72) Inventor: Randolph Wohlert, Austin, TX (US)

(73) Assignee: AT&T INTELLECTUAL PROPERTY I, L.P., Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/044,379

(22) Filed: Feb. 16, 2016

(65) Prior Publication Data

US 2016/0165183 A1 Jun. 9, 2016

Related U.S. Application Data

(63) Continuation of application No. 12/903,342, filed on Oct. 13, 2010, now Pat. No. 9,294,717.

(51) Int. Cl.
*H04N 7/14* (2006.01)

(52) U.S. Cl.
CPC .................... *H04N 7/147* (2013.01)

(58) Field of Classification Search
CPC combination set(s) only.
See application file for complete search history.

(56) References Cited

U.S. PATENT DOCUMENTS

| 7,443,447 | B2 | 10/2008 | Shirakawa | |
|---|---|---|---|---|
| 7,676,081 | B2* | 3/2010 | Blake | G06K 9/00234 358/538 |
| 7,907,774 | B2 | 3/2011 | Parr et al. | |
| 8,253,770 | B2* | 8/2012 | Kurtz | H04N 7/142 348/14.01 |
| 8,327,277 | B2* | 12/2012 | Thakkar | G06F 17/30056 715/751 |
| 2002/0131496 | A1* | 9/2002 | Vasudevan | H04N 21/2402 375/240.11 |
| 2003/0117501 | A1 | 6/2003 | Shirakawa | |
| 2003/0193619 | A1 | 10/2003 | Farrand | |
| 2004/0236830 | A1* | 11/2004 | Nelson | H04L 29/06027 709/204 |
| 2005/0001934 | A1* | 1/2005 | Hwang | H04N 5/45 348/569 |
| 2005/0230909 | A1* | 10/2005 | Gallant | A63F 9/10 273/156 |

(Continued)

*Primary Examiner* — Duc Nguyen
*Assistant Examiner* — Assad Mohammed
(74) *Attorney, Agent, or Firm* — Toler Law Group, PC

(57) ABSTRACT

A method includes determining, at a first computing device, first capabilities of a second computing device. The method includes setting, at the first computing device, a user configurable option based on a first capability of a second computing device, a second capability associated with a bandwidth of a network, or a combination thereof. The method includes generating, at the first computing device, multimedia content. The multimedia content includes a first layer and a second layer. The first layer includes first media content received from a first content source. A first bit rate of the first layer is determined based on the user configurable option. The method also includes sending the multimedia content to the second computing device.

20 Claims, 7 Drawing Sheets

(56) References Cited

U.S. PATENT DOCUMENTS

| | | |
|---|---|---|
| 2005/0254091 A1* | 11/2005 | Cranitch ............ H04N 1/00233 358/1.18 |
| 2005/0276570 A1 | 12/2005 | Reed et al. |
| 2005/0281397 A1* | 12/2005 | Hagale .................... H04L 51/04 379/88.22 |
| 2006/0245736 A1* | 11/2006 | Affaki ...................... H04N 5/45 386/235 |
| 2006/0285747 A1* | 12/2006 | Blake ................ G06K 9/00234 382/180 |
| 2008/0158018 A1 | 7/2008 | Lau |
| 2009/0234919 A1* | 9/2009 | Jefremov ............ H04L 43/0894 709/204 |
| 2009/0249424 A1* | 10/2009 | Gordon ................... H04N 5/44 725/118 |
| 2009/0257730 A1* | 10/2009 | Chen ................ H04N 1/00244 386/278 |
| 2010/0067782 A1* | 3/2010 | Dunn .................... G06T 11/001 382/162 |
| 2010/0138797 A1 | 6/2010 | Thorn |
| 2010/0245610 A1* | 9/2010 | Ahn .................... H04N 5/23219 348/222.1 |
| 2010/0289905 A1* | 11/2010 | Liu ........................ G01S 19/14 348/207.1 |
| 2011/0018963 A1* | 1/2011 | Robinson ............... G06Q 10/00 348/14.16 |
| 2011/0164105 A1 | 7/2011 | Lee et al. |
| 2011/0184953 A1* | 7/2011 | Joshi ................ G06F 17/30241 707/738 |
| 2011/0249077 A1* | 10/2011 | Abuan ................... H04N 7/147 348/14.02 |
| 2011/0283223 A1* | 11/2011 | Vaittinen ............ G01C 21/3647 715/781 |
| 2011/0314412 A1 | 12/2011 | Aldinger et al. |
| 2012/0013705 A1 | 1/2012 | Taylor et al. |
| 2012/0038742 A1* | 2/2012 | Robinson ............... H04N 7/142 348/14.16 |
| 2012/0056971 A1 | 3/2012 | Kumar et al. |
| 2012/0079606 A1* | 3/2012 | Evans ..................... G06F 21/10 726/28 |

\* cited by examiner

SYSTEM AND METHOD TO ENABLE LAYERED VIDEO MESSAGING

PRIORITY CLAIM

This application is a continuation of, and claims priority to, U.S. patent application Ser. No. 12/903,342, filed Oct. 13, 2010, which is hereby incorporated by reference in its entirety.

FIELD OF THE DISCLOSURE

The present disclosure is generally related to layered video messaging.

BACKGROUND

In video messaging, a first user may send a camera feed (i.e., live streaming video) from a first computing device, such as a wireless phone, to a second computing device associated with a second user. The second user may send a camera feed from the second computing device to the first computing device. However, when the first computing device and the second computing device have different capabilities, video messaging between the two devices may be difficult to achieve. For example, when the second computing device has limited bandwidth capabilities, the camera feed of the first computing device may exceed the bandwidth capability of the second computing device. In addition, users may desire a rich environment that provides more than just a single camera feed.

DETAILED DESCRIPTION

Figure 1:
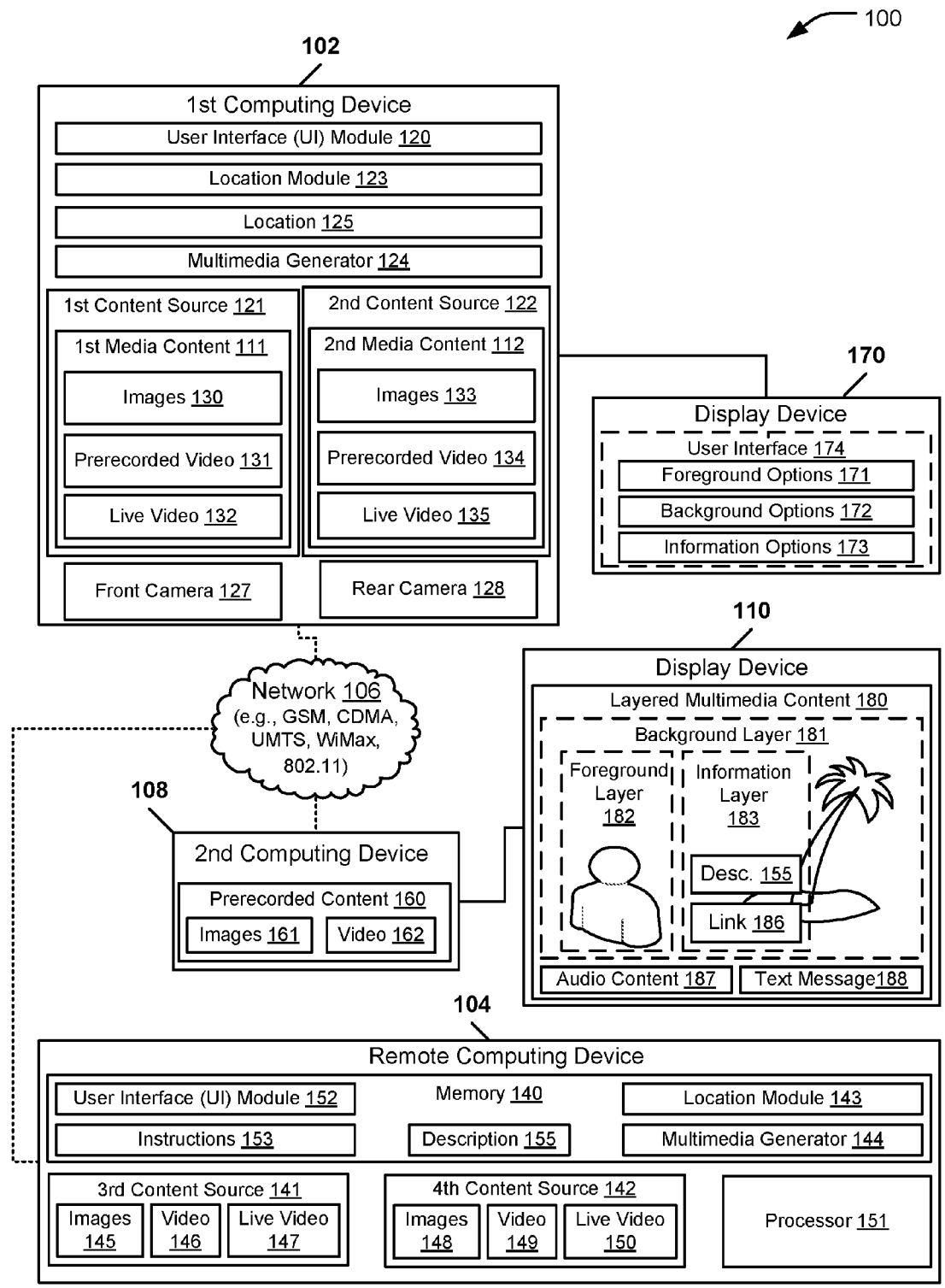
FIG. 1 is a block diagram of a first particular embodiment of a system to generate layered multimedia content.

Video messaging may be enhanced by enabling users to send and receive layered multimedia content rather than a single camera feed. For example, in the layered multimedia content, an image or a video stream of the user may be displayed in the foreground and an image or a video stream associated with a current location of the user may be displayed in the background. In addition, the layered multimedia content may provide information associated with the current location of the user.

To generate the layered multimedia content, a user may be presented with a user interface to enable the user to select a foreground content source and a background content source. The user interface may be presented to the user by the computing device or by a remote server. For example, the user may use the user interface to select a forward facing camera of a computing device as the foreground content source and to select a backward facing camera of the computing device as the background content source. The computing device may be a wireless computing device, such as a mobile phone, a personal digital assistant, or a tablet computing device. Location information associated with a location of the computing device may be retrieved. Layered multimedia content may be generated that includes foreground content provided by the foreground content source, background content provided by the background content source, and the location information. The layered multimedia content may be generated by the computing device, by the remote server, or both. The layered multimedia content may be sent to one or more additional computing devices.

In a particular embodiment, a method includes selecting, at a first computing device, a first content source as a foreground content source and a second content source as a background content source. The method includes determining a location of the first computing device. The method also includes generating layered multimedia content. The layered multimedia content includes a foreground layer including first media content received from the first content source, a background layer including second media content received from the second content source, an information layer including data associated with the location to the first computing device, and audio content. The method includes sending the layered multimedia content to at least a second computing device.

In another particular embodiment, a non-transitory computer-readable storage medium includes operational instructions that, when executed by a processor, cause the processor to provide, at a first computing device, a user interface to enable selection of a foreground content source and a background content source. The operational instructions are further executable by the processor to generate layered multimedia content including a plurality of layers that include a foreground layer received from the foreground content source, a background layer received from the background content source, and an information layer including data associated with a location of the first computing device. The operational instructions are further executable by the processor to send the layered multimedia content to at least a second computing device via a network.

In another particular embodiment, a system includes a server computing device to provide a user interface to a first computing device to enable selection of a foreground content source and a background content source. The server computing device generates layered multimedia content including a plurality of layers that include a foreground layer received from the foreground content source, a background layer received from the background content source, and an information layer including data associated with a location of the first computing device. The server computing device sends the layered multimedia content to at least a second computing device via a network.

Referring to FIG. 1, a block diagram of a particular embodiment of a system to generate layered multimedia content is depicted and generally designated 100. The system 100 includes a first computing device 102 and a second computing device 108 coupled to a remote computing device 104 via a network 106. The first computing device 102 and the second computing device 108 may each be portable computing devices, such as a wireless mobile telephone, a wireless tablet personal computer, a personal digital assistant, another type of portable computing device, or any combination thereof.

A display device 110 is coupled to the second computing device 108. The display device 110 may be integrated with the second computing device 108 or separate from the second computing device 108. The display device 110 may include a speaker (not shown) that is capable of generating sounds based on audio content 187. Prerecorded content 160 may be stored at the second computing device 108. The prerecorded content 160 may include images 161 and video 162.

The network 106 may be a wireless network that provides wireless network access to computing devices, such as the computing devices 102, 104, and 108. The network 106 may provide wireless network access based on a global system for mobile (GSM) standard, a code division multiple access (CDMA) standard, a universal mobile telephone service (UMTS) standard, a 802.11x standard, a WiMax standard, or any combination thereof.

The first computing device 102 may include a user interface module 120, a first content source 121, a second content source 122, a location module 123, a multimedia generator 124, a front camera 127, a rear camera 128, or any combination thereof. The first content source 121 may include or may generate first media content 111 that includes images 130, prerecorded video 131, live video 132, other media content, or any combination thereof. The second content source 122 may include or may generate second media content 112 that includes images 133, prerecorded video 134, live video 135, other media content, or any combination thereof. The images 130 and 133 may be still images, such as photographs, emoticons, avatars, graphical drawings, another type of image, or any combination thereof. The images 130 and 133 and the pre-recorded video 131 and 134 may include content that the user previously generated and stored at the first computing device 102 (e.g., using one of the cameras 127-128).

The user interface module 120 may provide a user interface 174 for display at a display device 170 that is coupled to the first computing device 102. The user interface 174 may enable a user to select different content sources, such as the first content source 121 and the second content source 122, as content sources for generating layered multimedia content 180. For example, the user interface 174 may include foreground options 171 to enable selection of parameters associated with a foreground layer 182, background options 172 to enable selection of parameters associated with a background layer 181, and information options 173 to enable selection of parameters associated with an information layer 183. The options 171-173 may enable the user to select a size of each of the layers 181-183, a positioning within a display area of each of the layers 181-183, a transparency level of each of the layers 181-183, a display resolution of each of the layers 181-183, an allocation of available bandwidth of each of the layers 181-183, another layer-related option, or any combination thereof.

The user interface module 120 may enable the cameras 127-128 to be selected to provide the live video 132 and the live video 135. For example, the camera 127 may be selected via the user interface 174 to provide the live video 132 and the camera 128 may be selected via the user interface 174 to provide the live video 135. The location module 123 may determine a location 125 of the first computing device 102. For example, the location module 123 may use a global positioning system (GPS) to determine the location 125 associated with the first computing device 102. The multimedia generator 124 may generate the layered multimedia content 180 that includes content provided by at least one of the first content source 121 and the second content source 122. The layered multimedia content 180 may include the audio content 187, such as speech, and a text message 188, generated by the user of the first computing device 102.

The remote computing device 104 may be a server of a service provider (e.g., a wireless service provider) that provides services to computing devices (e.g., the computing devices 102 and 108) of subscribers. The remote computing device 104 may include a memory 140, a third content source 141, a fourth content source 142, and a processor 151. The memory 140 may include a user interface module 152, instructions 153, a location module 143, and a multimedia generator 144. The processor 151 may execute the instructions 153, the user interface module 152, the location module 143, and the multimedia generator 144 to perform various functions of the remote computing device 104. The user interface module 152 may provide the user interface 174 to one or more of the first computing device 102, the second computing device 108, another computing device, or any combination thereof. The third content source 141 may include images 145, video content 146, and live video content 147. The fourth content source 142 may include images 148, video content 149 and live video content 150. The images 145 and 148 and the video content 146 and 149 may be provided by a service provider of the network 106, may be uploaded from a computing device (e.g., the first computing device 102 or the second computing device 108), or any combination thereof. The live video content 147 and 150 may be live video from a network broadcast studio. For example, a user may select the first media content source 111 to provide the live video content 132 from the front camera 127 for the foreground layer 182 and may select the live video content 147 of the third content source 141 to provide the background layer 181. In this way, the user can generate layered multimedia content 180 depicting the user at a particular event, such as a sporting event. The location module 143 may determine a location of the first computing device 102, the second computing device 108, another computing device, or any combination thereof. For example, the location module 143 may be operable to use GPS to determine the location 125 of the first computing device 102. The multimedia generator 144 may generate the layered multimedia content 180 for display at a display device, such as the display device 110 that is coupled to the second computing device 108.

In operation, in a first particular embodiment, the user interface 174 may be presented to a user of the first computing device 102. The user interface 174 may enable the user to select the first content source 121 as a foreground content source to provide a foreground layer 182 of the layered multimedia content 180. The user interface 174 may enable the user to select the second content source 122 as a background content source to provide a background layer 181 of the layered multimedia content 180. The location module 123 may determine the location 125 of the first computing device 102 and request that the remote computing device 104 retrieve a description 155 of the location 125. The remote computing device 104 may retrieve the description 155 and send the description 155 to the first computing device 102. The multimedia generator 124 may generate the layered multimedia content 180. The first computing device 102 may send the generated layered multimedia content 180 from the first computing device 102 to the second computing device 108 via the network 106 for display at the display device 110.

The layered multimedia content 180 may include the background layer 181, the foreground layer 182, and an information layer 183. The foreground layer 182 may include the first media content 111 that is received from the first content source 121. The background layer 181 may include the second media content 112 that is received from the second content source 122. The information layer 183 may include data that provides information associated with the location 125. The information layer 183 may include the description 155 and a link 186. The description 155 may describe the location 125 or a point of interest near the location 125. For example, when the user is standing near the Empire State Building in New York, the description 155 may describe details associated with the Empire State Building. The link 186 may be a hypertext link to enable a recipient to select the link to display additional information associated with the location 125. The description 155 may include a selectable link 186 to access additional information associated with the point of interest 156. The first computing device 102 may send the layered multimedia content 180 to another computing device, such as the second computing device 108, via the network 106. The second computing device 108 may display the layered multimedia content 180 at the display device 110.

When the first content source 121 is selected as the foreground content source, one or more of the images 130, the prerecorded video content 131, and the live video stream 132 may be used to provide media content for the foreground layer 182 of the layered multimedia content 180. When the second content source 122 is selected as the background content source, one or more of the images 133, the prerecorded video content 134, and the live video stream 135 may be used to provide media content for the background layer 181 of the layered multimedia content 180.

In a second particular embodiment, the user interface module 152 may generate the user interface 174 at the remote computing device 104 and send the user interface 174 to the first computing device 102 for display at the display device 170. For example, the remote computing device 104 may generate the user interface 174 when the first computing device 102 does not have sufficient computing capabilities to generate the user interface 174. The user interface 174 may enable the user to select the third content source 141 as the foreground content source to provide the foreground layer 182. The user interface 174 may enable the user to select the fourth content source 142 as the background content source to provide the background layer 181. The location module 143 may determine the location 125 of the first computing device 102 and retrieve the description 155. The multimedia generator 144 may generate the layered multimedia content 180 and send the layered multimedia content 180 to the second computing device 108.

Additional embodiments may include a combination of the first embodiment and the second embodiment. For example, in a third particular embodiment, the first computing device 102 may be capable of providing the user interface 174 but may not be capable of generating the layered multimedia content 180. In this embodiment, the user interface module 120 of the first computing device 102 may generate the user interface 174 and the multimedia generator 144 of the remote computing device 104 may generate the layered multimedia content 180. As another example, in a fourth particular embodiment, the computing device 102 may have the front camera 127 but not the rear camera 128. The front camera 127 may be selected to provide the content for the foreground layer 182 and content from the third content source 141 (such as images from the images 145) may be selected to provide the background layer 181.

Thus, a user may send the layered multimedia content 180 to one or more computing devices via the network 106. The layered multimedia content 180 may include at least a background layer 181, a foreground layer 182, and an information layer 183. The user may select a content source to provide the background layer 181 and to provide the foreground layer 182. Each content source may provide static images (e.g., photos), prerecorded video, live video, or any combination thereof. For example, the layered multimedia content 180 may include an image or video of the user in the foreground layer 182 and may include an image or a video of the location 125 of the computing device 102 in the background layer 181. The information layer 183 may provide data describing the location 125 to a recipient of the layered multimedia content 180.

Figure 2:
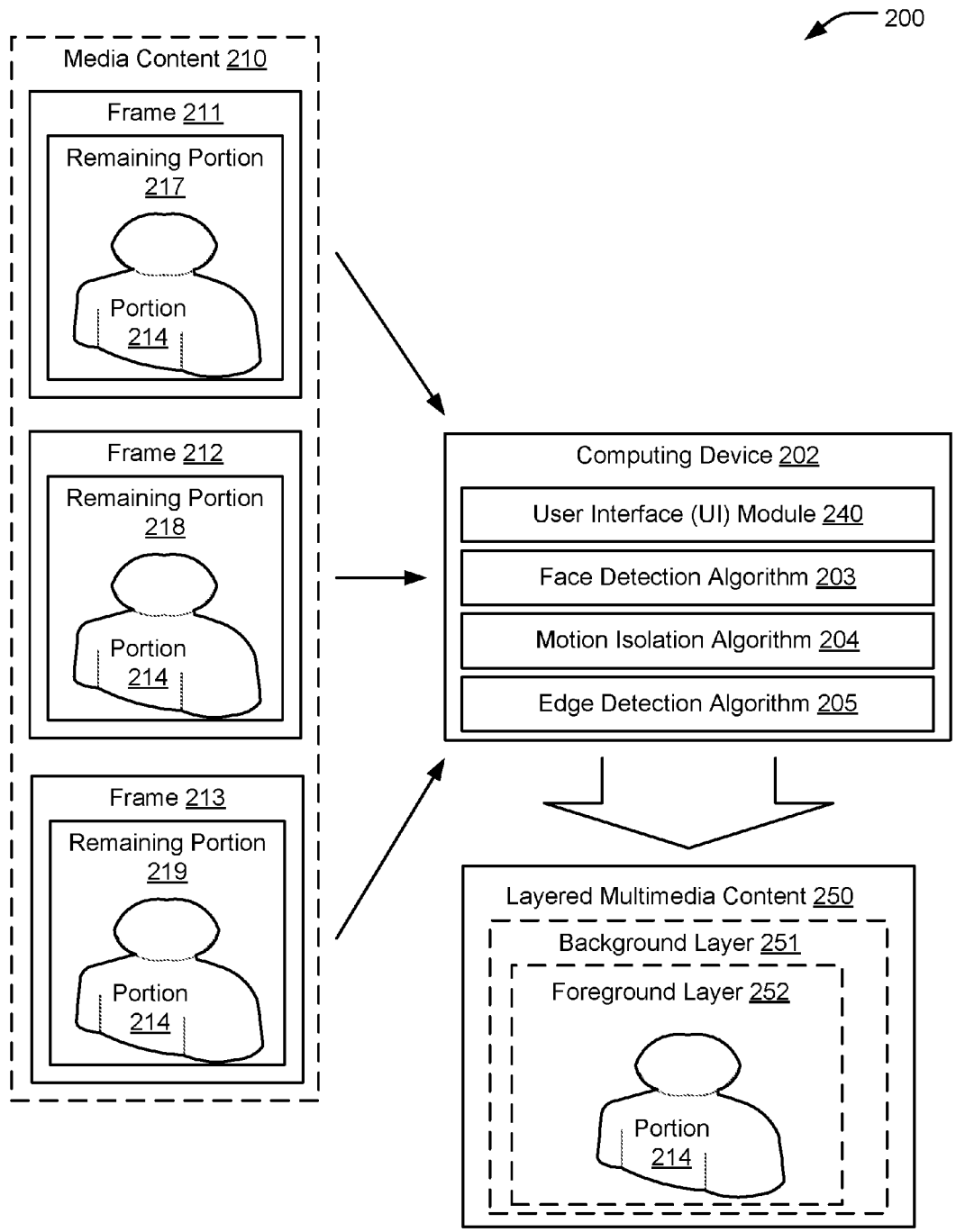
FIG. 2 is a block diagram of a second particular embodiment of a system to generate layered multimedia content.

Referring to FIG. 2, a block diagram of a second particular embodiment of a system to generate layered multimedia content is depicted and generally designated 200. The system 200 includes a computing device 202. The computing device 202 may be a computing device such as the first computing device 102, the remote computing device 104, and the second computing device 108 of FIG. 1. The system 200 illustrates how a portion of a content source may be selected for inclusion in layered multimedia content 250.

The computing device 202 may include a user interface module 240, a face detection algorithm 203, a motion isolation algorithm 204, and an edge detection algorithm 205. The computing device 202 may analyze frames (e.g., frames 211, 212, and 213) of media content 210 to identify a portion 214 of the media content 210 for inclusion in a layer of the layered multimedia content 250. The frames 211-213 may be captured by a camera, such as one of the cameras 127-128 of FIG. 1. Remaining portions 217, 218, and 219 of the frames 211, 212, and 213, respectively, may be omitted from the layered multimedia content 250. For example, the portion 214 may include a head or torso of a user and the remaining portions 217-219 may include an area around or behind the user.

The computing device 202 may generate the layered multimedia content 250 that includes a foreground layer 252 and a background layer 251. The foreground layer 252 may be include the portion 214 of the frames 211-213. The foreground layer 252 may be provided by one or more of the face detection algorithm 203, the motion isolation algorithm 204, and the edge detection algorithm 205. The background layer 251 may be provided by a content source, such as the content sources 121-122 of FIG. 1. For example, the background layer 251 may be provided by the rear camera 128, the images 133, the prerecorded video 134, or any combination thereof.

In operation, the user interface module 240 may provide a user interface (not shown) to enable a user to select the portion 214 of the media content 210 for inclusion in a layer, such as one of the layers 251-252 of the layered multimedia content 250. For example, selecting the portion 214 of the media content 210 for inclusion in the foreground layer 252 may include selecting an object in a center of one of the frame 211-213. After the user has selected an object in one of the frames 211-213, one or more of the face detection algorithm 203, the motion isolation algorithm 204, and the edge detection algorithm 205 may be used to identify the portion 214 for inclusion in the foreground layer 252 of the layered multimedia content 250.

For example, the user may instruct the user interface module 240 to include a face of a human image in the foreground layer 252. The face detection algorithm 203 may receive each of the frames 211-213 of the media content 210 and identify the face of the human image in each the frames 211-213. In this way, the face detection algorithm 203 may identify the portion 214 of the media content 210 for inclusion in the foreground layer 252 of the layered multimedia content 250.

In another example, the user may instruct the user interface module 240 to include a portion of the frames 211-213 that is relatively motionless in the foreground layer 252. The motion isolation algorithm 204 may receive each of the frames 211-213 of the media content 210 and determine that the portion 214 is relatively motionless in the frames 211-213. The motion isolation algorithm 204 may determine that the remaining portions 217-219 include motion. In this way, the motion isolation algorithm 204 may identify the portion 214 of the media content 210 for inclusion in the foreground layer 252 of the layered multimedia content 250.

In yet another example, the user may select the portion 214 of one of the frames 211-213 via the user interface module 240. The edge detection algorithm 205 may receive each of the frames 211-213 of the media content 210 and detect an edge of the portion 214 to isolate the portion 214 from the remaining portions 217-219 for display in the foreground layer 252. In this way, the edge detection algorithm 205 may identify the portion 214 of the media content 210 for inclusion in the foreground layer 252 of the layered multimedia content 250.

A combination of the modules 203-205 may be used to identify the portion 214 of the media content 210 for inclusion in the foreground layer 252 of the layered multimedia content 250. For example, the user may select the portion 214 in a particular frame (e.g., the frame 211) for inclusion in the foreground layer 252 using the face detection algorithm 203. The portion 214 may be identified in subsequent frames (e.g., the frames 212-213) using the motion isolation algorithm 204, the edge detection algorithm 205, or a combination of the two.

Thus, one or more of the face detection algorithm 203, the motion isolation algorithm 204, and the edge detection algorithm 205 may be used to isolate the portion 214 from the frames 211-213 for inclusion in the foreground layer 252 of the layered multimedia content 250. The user can generate the layered multimedia content 250 featuring the portion 214 in the foreground layer 252. The portion 214 may include a portion of a user, such as a face, a head or a torso. The background layer 251 may be a live video stream, pre-recorded video, or image of a point of interest that is near a location of the user.

Figure 3:
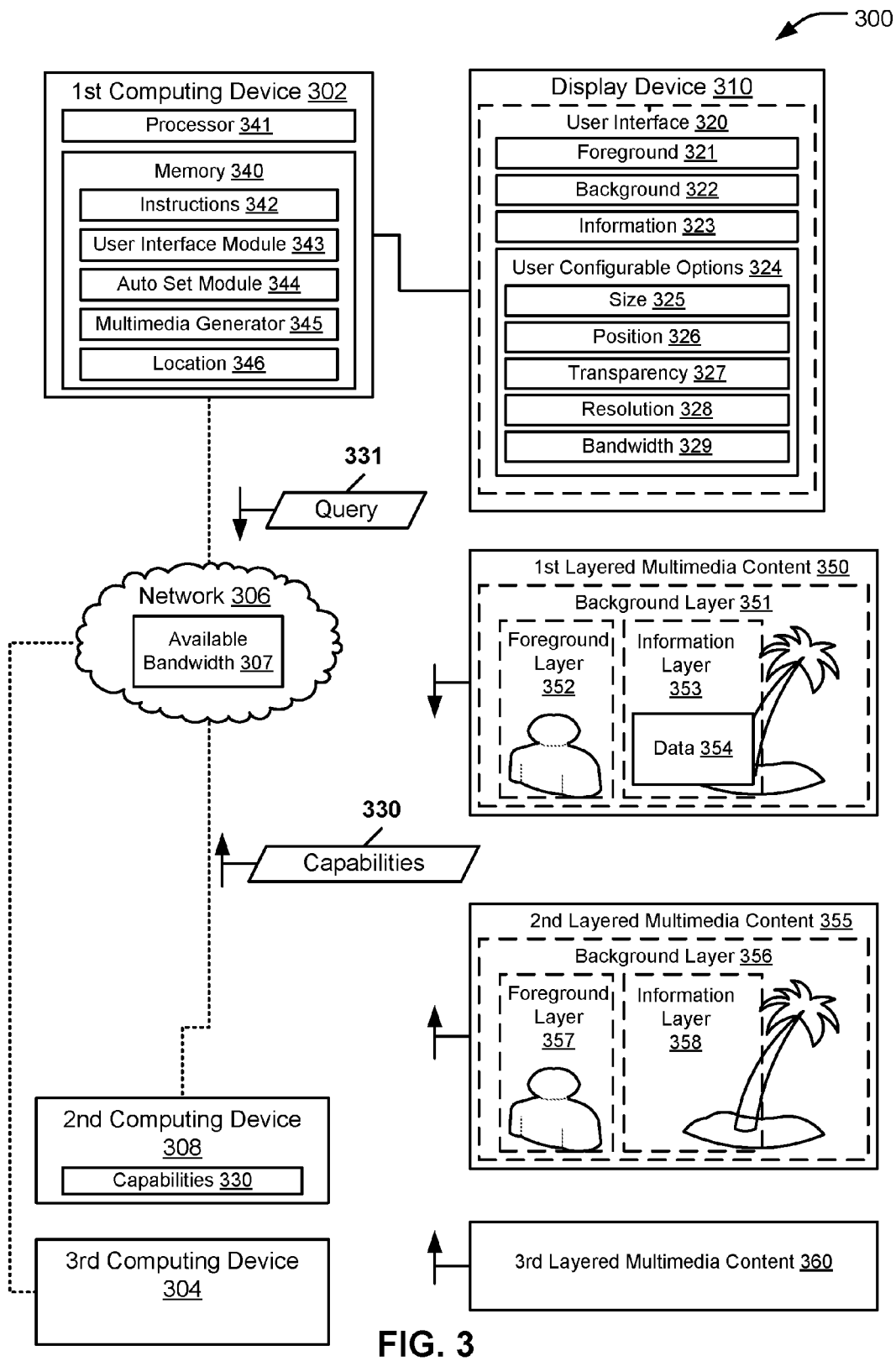
FIG. 3 is a block diagram of a third particular embodiment of a system to generate layered multimedia content.

Referring to FIG. 3, a block diagram of a third particular embodiment of a system to generate layered multimedia content is depicted and generally designated 300. The system 300 includes a first computing device 302 and a second computing device 308 coupled to a third computing device 304 via a network 306. The first computing device 302 may be coupled to a display device 310. The first computing device 302 may include a memory 340 and a processor 341. The memory 340 may include instructions 342, a user interface module 343, an auto set module 344, and a multimedia generator 345. The instructions 342 and the modules 343-345 may be executable by the processor 341 to perform various functions, such as generating first layered multimedia content 350 and second layered multimedia content 355. Each of the computing devices 302, 304, and 308 may be a computing device, such as the first computing device 102 of FIG. 1.

In operation, a user interface 320 may be provided at the display device 310 associated with the first computing device 302. For example, the user interface 320 may be provided by the user interface module 343. The user interface 320 may enable selection of a foreground content source 321, a background content source 322, and an information content source 323. For example, foreground content sources 321 and background content source 322 may include or may generate images (e.g., the images 130 and 133 of FIG. 1), prerecorded video (e.g., the prerecorded video 131 and 134 of FIG. 1), and live video. The live video may be received from a camera, such as one of the cameras 127-128 of FIG. 1. The processor 341 may execute the instructions 342 to identify a location 346 associated with the first computing device 302 and retrieve data 354 that is descriptive of the location 346. For example, the data 354 may be retrieved from a remote server of a service provider, such as the remote computing device 104 of FIG. 1.

The processor 341 may execute the instructions 342 to generate the first layered multimedia content 350 that includes a foreground layer 352, a background layer 351, and an information layer 353. The information layer 353 may include the data 354 that is descriptive of the location 346 of the first computing device 302. The processor 341 may execute the instructions 342 to send the layered multimedia content 350 from the first computing device 302 to the second computing device 308 and the third computing device 304 via the network 306.

The first layered multimedia content 350 may be generated based on user configurable options 324. The user configurable options 324 may be associated with one or more layers of the first layered multimedia content 350, such as the foreground layer 352, the background layer 351, and the information layer 353. The user configurable options 324 may include settings associated with each of the layers 352-354, such as a size 325, a position 326, a transparency 327, a resolution 328, and a bandwidth 329 of each layer. The size 325 setting may enable a user to select a size setting for each of the layers 351-353. For example, the size 325 setting may be specified using dimensions (e.g., one inch by two inches) of a layer, pixels (e.g., one hundred by two hundred pixels) of a layer, a percentage of a display area (e.g., twenty-five percent) of a layer, other size-related setting, or any combination thereof. The position 326 may enable a user to select a display position (e.g., center of the display area, right half of the display area) for each of the layers 351-353. The transparency 327 may enable the user to select a transparency associated with each of the layers 351-353. The resolution 328 may enable the user to select the display resolution of the layers 351-353. The bandwidth 329 may enable the user to select an allocation of available bandwidth for each of the layers 351-353.

The auto set module 344 may automatically set one or more of the user configurable options 324 based on an available bandwidth 307 of the network 306. For example, when the available bandwidth 307 satisfies a particular threshold, the auto set module 344 may set one or more of the user configurable options 324 to reduce a bandwidth usage of the first layered multimedia content 350. To illustrate, the auto set module 344 may set one or more of the size 325, the resolution 328, and the bandwidth 329 to reduce the bandwidth usage of the first layered multimedia content 350 based on the available bandwidth 307.

The auto set module 344 may send a query 331 to the second computing device 308 to determine capabilities 330 of the second computing device 308. The auto set module 344 may automatically set one or more of the user configurable options 324 based on the capabilities 330. For example, the second computing device 308 may be capable of displaying video at a maximum rate of fifteen frames per second while the first computing device 302 may be capable of generating video at a maximum rate of thirty frames per second. In this example, the auto set module 344 may set one or more of the user configurable options 324 so that video content of the first layered multimedia content 350 has a maximum rate of fifteen frames per second.

The processor 341 may execute the instructions 342 to generate the layered multimedia content 350 for preview at the display device 310 before sending the layered multimedia content 350 to the second computing device 308. Based on the preview, the user may modify the user configurable options 324 to configure the layered multimedia content 350 before sending the layered multimedia content 350 to the second computing device 308.

A user of the first computing device 302 may engage in a video conferencing session with a user of the second computing device 308. For example, the first computing device 302 may generate and send the first layered multimedia content 350 to the second computing device 308. The second computing device 308 may generate and send second layered multimedia content 355 to the first computing device 302. The second layered multimedia content 355 may include a background layer 356, a foreground layer 357, and an information layer 358. During the video conferencing session, the processor 341 may execute the instructions 342 to send the first layered media content 350 from the first computing device 302 to the second computing device 308 substantially concurrently with receiving the second layered multimedia content 355 from the second computing device 308.

The user of the first computing device 302 may engage in a video conferencing session with multiple users. For example, the user of the first computing device 302 may engage in a video conferencing session with the user of the second computing device 308 and a user of the third computing device. The third computing device 304 may generate and send third layered multimedia content 360 to the first computing device 302 and the second computing device 308. The first computing device 302 may send the first layered multimedia content 350 from the first computing device 302 to the second computing device 308 and to the third computing device 304 substantially concurrently with receiving the second layered multimedia content 355 from the second computing device 308 and receiving the third layered multimedia content 360 from the third computing device. The user configurable options 324 may enable the user of the first computing device 302 to view the second layered multimedia content 355 and the third layered multimedia content 360 simultaneously. For example, the user configurable options 324 may enable the user of the first computing device 302 to view the second layered multimedia content 355 on a left half of the display device 310 and view the third layered multimedia content 360 on a right half of the display device 310.

Thus, a user may use the user configurable options 324 to specify various parameters for each layer of the first layered multimedia content 350, such as the size, position, transparency, resolution, and bandwidth allocation of each layer. The user can preview the first layered multimedia content 350 before sending the first layered multimedia content 350 to the second computing device 308. The first computing device 302 may receive the second layered multimedia content 355 from the second computing device 308 substantially concurrently with sending the first layered multimedia content 350 from the first computing device 302 to the second computing device 308.

Figure 4:
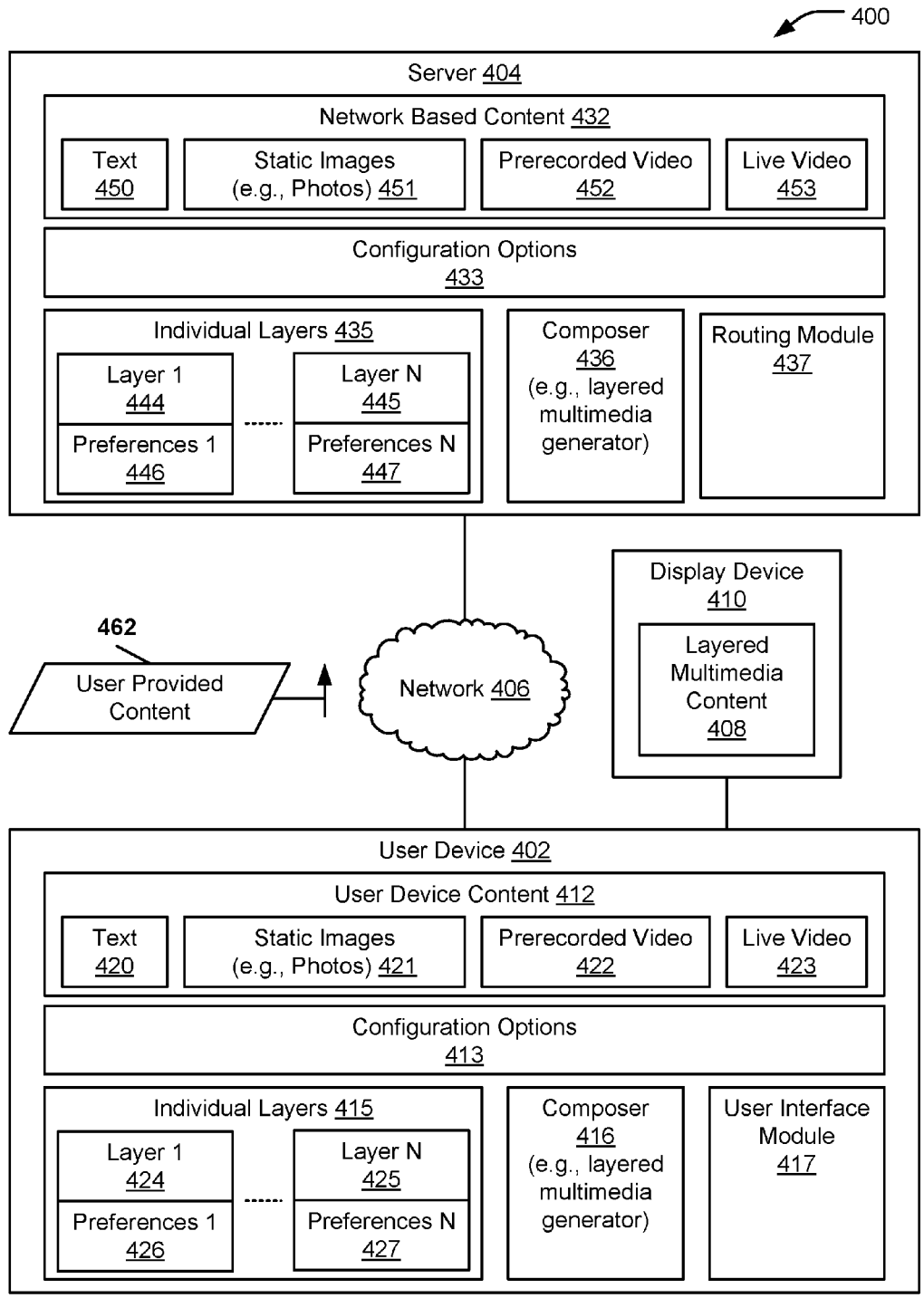
FIG. 4 is a block diagram of a fourth particular embodiment of a system to generate layered multimedia content.

Referring to FIG. 4, a block diagram of a fourth particular embodiment of a system to generate layered multimedia content is depicted and generally designated 400. The system 400 includes a user device 402 coupled to a server 404 via a network 406. A display device 410 is coupled to the user device 402. The display device 410 may be integrated into the user device 402 or separate from the user device 402. In a first particular embodiment, when the user device 402 is capable of generating layered multimedia content 408, the user device 402 may generate and send the layered multimedia content 408 to another user device (not shown). The user device 402 may generate the layered multimedia content 408 based on user device content 412 that is available at the user device 402, network based content 432 that is available at the server 404, or a combination of the two. In a second particular embodiment, when the user device 402 lacks the capability to generate the layered multimedia content 408, the user device 402 may instruct the server 404 to generate and send the layered multimedia content 408 to another user device (not shown). The server 404 may generate the layered multimedia content 408 based on network based content 432, user provided content 462 that is uploaded to the server 404 by a user, or a combination of the two.

The user device 402 may include the user device content 412, configuration options 413, a composer 416, and a user interface module 417. The user device content 412 may include content available at the user device 402 for inclusion in one or more layers of the layered multimedia content 408. The user device content 412 may include text 420, static images (e.g., photos) 421, prerecorded video 422, live video 423, other media content, or any combination thereof. The text 420 may include information input by a user that describes locations associated with the user (e.g., "this is my new house in the northwest suburb of the city" or "this is my office building in downtown"). The static images 421 may include images, such as photographs, drawings, graphical avatars, and other types of images. The text 420, the static images 421, and the prerecorded video 422 may be previously recorded content that the user has stored at the user device 402 for use in generating the layered multimedia content 408. The live video 423 may include video content provided by a camera (not shown) associated with the user device 402. The composer 416 may generate the layered multimedia content 408 based on individual layers 415. The individual layers 415 may include pointers to one or more media content items of the network based content 432, the user device content 412, or any combination thereof. The individual layers 435 may include user provided content 462 received from the user device 402.

The configuration options 413 may include options for configuring and generating the layered multimedia content 408, such as the user configurable options 324 of FIG. 3. For example, the user may specify in the configuration options 413 that a foreground layer of the layered multimedia content 408 include the live video 423 and a background layer of the layered multimedia content 408 include a static image from the static images 421. The configuration options 413 may specify content sources for each of the individual layers 415 that are used to generate the layered multimedia content 408. For example, the configuration options 413 may specify first preferences 426 associated with a first layer 424 and Nth preferences 427 associated with an Nth layer 425 of the layered multimedia content 408. The composer 416 may generate the layered multimedia content 408 based on the individual layers 415.

The server 404 may include the network based content 432, configuration options 433, individual layers 435, a composer 436, and a routing module 437. The network based content 432 may include content available at the server 404 for inclusion in one or more layers of the layered multimedia content 408. The network based content 432 may include text 450, static images (e.g., photos) 451, prerecorded video 452, and live video 453. The text 450 may include information input by the user and uploaded to the server 404 and information that was not input by the user. For example, when the server 404 identifies a point of interest near a location of the user device 402, the server 404 may retrieve the text 450 from a database that provides information for points of interest. The static images 451 may include images uploaded to the server 404 by the user as well as default/stock images provided by a service provider. The prerecorded video 452 may include video content that was previously recorded by the user and uploaded to the server 404 or video retrieved by the server 404. For example, when the server 404 identifies a point of interest near the location of the user device 402, the server 404 may provide the live video 453 or retrieve the prerecorded video 452 from a database that stores video for points of interest. The live video 453 may include a live network feed (e.g., from a broadcast network or a service provider of the network 406) or the user provided content 462 from a camera (not shown) associated with the user device 402.

The configuration options 433 may include options for configuring the layered multimedia content 408, such as the user configurable options 324 of FIG. 3. For example, the user may specify in the configuration options 433 that a foreground layer of the layered multimedia content 408 is provided by a static image of the static images 451 and a background layer of the layered multimedia content 408 is provided by the prerecorded video 452. The configuration options 433 may specify preferences for each of the individual layers 435 that are used to generate the layered multimedia content 408. For example, the configuration options 433 may specify first preferences 446 associated with a first layer 444 and Nth preferences 447 associated with an Nth layer 445 of the layered multimedia content 408. The individual layers 435 may include content from the network based content 432, from the user device content 412, or any combination thereof. For example, the user may send the user provided content 462 to the server 404 for inclusion in the individual layers 435. The user provided content 462 may be one or more of the text 420, the static images 421, the prerecorded video 422, and the live video 423. The composer 436 may generate the layered multimedia content 408 based on the individual layers 435. Each of the individual layers 435 may be generated based on the network based content 432, the user provided content 462, the configuration options 413, and the configuration options 433.

In operation, in a first particular embodiment, the user device 402 may generate the layered multimedia content 408 using the user device content 412, the network based content 432, or any combination thereof. The layered multimedia content 408 may include two or more layers (e.g., up to N layers). The user may specify preferences for each of the N layers, such as a size of each layer, a position of each layer, a transparency of each layer, and a bandwidth allocation of each layer. In a second particular embodiment, the server 404 may generate the layered multimedia content 408 using the network based content 432, the user provided content 462, or any combination thereof.

Thus, when the user device 402 is capable of generating layered multimedia content 408, the user device 402 may generate and send the layered multimedia content 408 to another user device based on the user device content 412, the network based content 432, or any combination thereof. When the user device 402 lacks the capability to generate the layered multimedia content 408, the user device 402 may instruct the server 404 to generate and send the layered multimedia content 408 to another user device based on the network based content 432, the user provided content 462, or any combination thereof.

Figure 5:
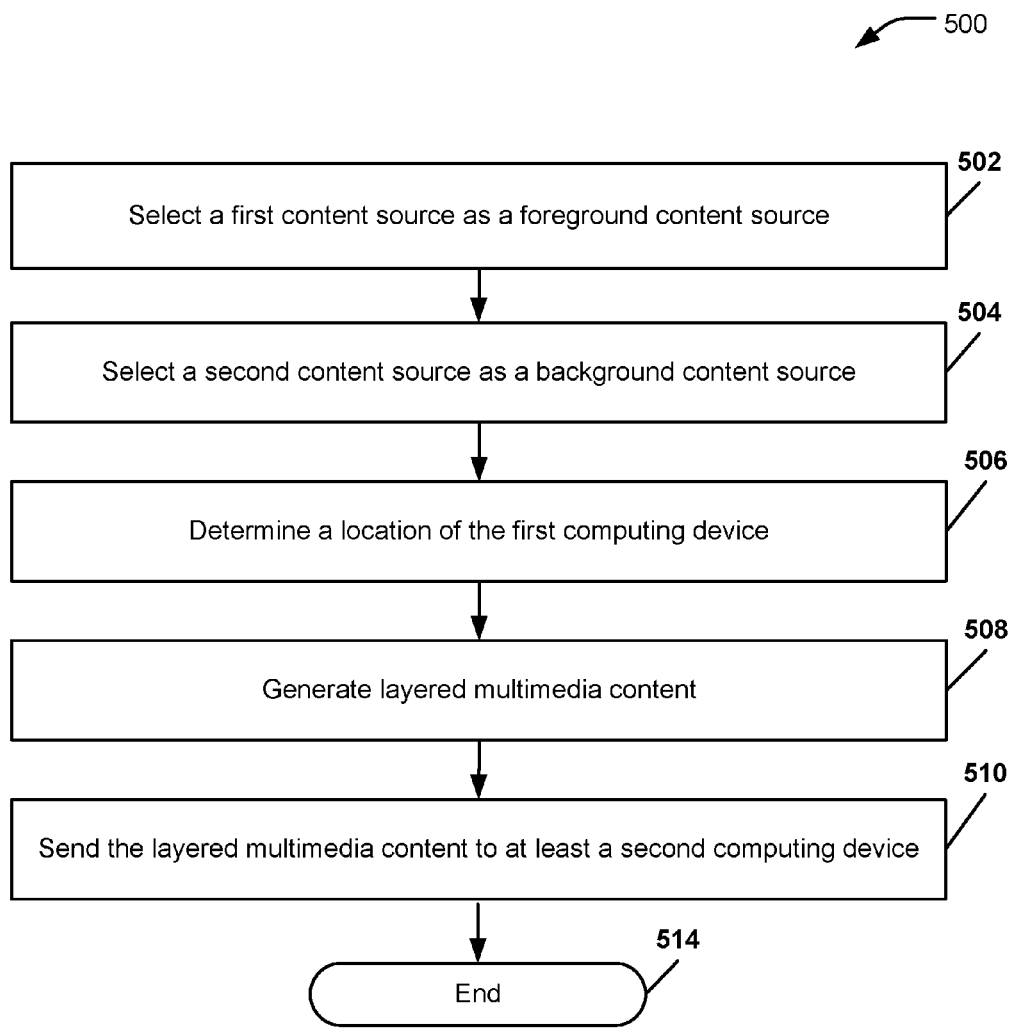
FIG. 5 is a flow diagram of a first particular embodiment of a method to generate layered multimedia content.

Referring to FIG. 5, a flow diagram of a first particular embodiment of a method to generate layered multimedia content is depicted and generally designated 500. The method may be performed by a computing device, such as the computing devices 102, 104 and 108 of FIG. 1, the computing device 202 of FIG. 2, the computing devices 302, 304, and 308 of FIG. 3, the user device 402 of FIG. 4, or the server 404 of FIG. 4.

The method begins when a first content source is selected as a foreground content source, at 502. Moving to 504, a second content source is selected as a background content source. The foreground content source and the background content source may be a static image, a prerecorded video stream, a live video stream, or any combination thereof. The first content source and the second source may be selected manually by a user via a user interface (e.g., the user interface 174 of FIG. 1) or automatically by a device based on user preferences (e.g., specified via the configuration options 413 and 433 of FIG. 4). For example, the first content source and the second content source may be automatically selected based on an available bandwidth of a network, a capability of a receiving device, or any combination thereof. Proceeding to 506, a location of the computing device may be determined. For example, in FIG. 1, either the first computing device 102 or the remote computing device 104 may determine the location 125 of the first computing device 102 using the global positioning satellite (GPS) system.

Advancing to 508, layered multimedia content may be generated. The layered multimedia content may include a foreground layer including first media content received from the first content source, a background layer including second media content received from the second content source, and an information layer including data associated with the location. For example, the layered multimedia content may include a live video stream of a user in the foreground layer, a live video stream of a point of interest near the location of the user's computing device, and information describing the point of interest in the information layer. The layered multimedia content may also include text (e.g., a text message) and audio (e.g., speech). Proceeding to 510, the layered multimedia content is sent to at least a second computing device, and the method ends at 514.

Thus, a user can specify a foreground content source and a background source to generate layered multimedia content. The foreground content source may be a live video stream of the user from a front facing camera of a user device and the background content source may a live video stream of a point of interest from a rear facing camera of the user device. The layered multimedia content may include an information layer containing data descriptive of the point of interest.

Figure 6:
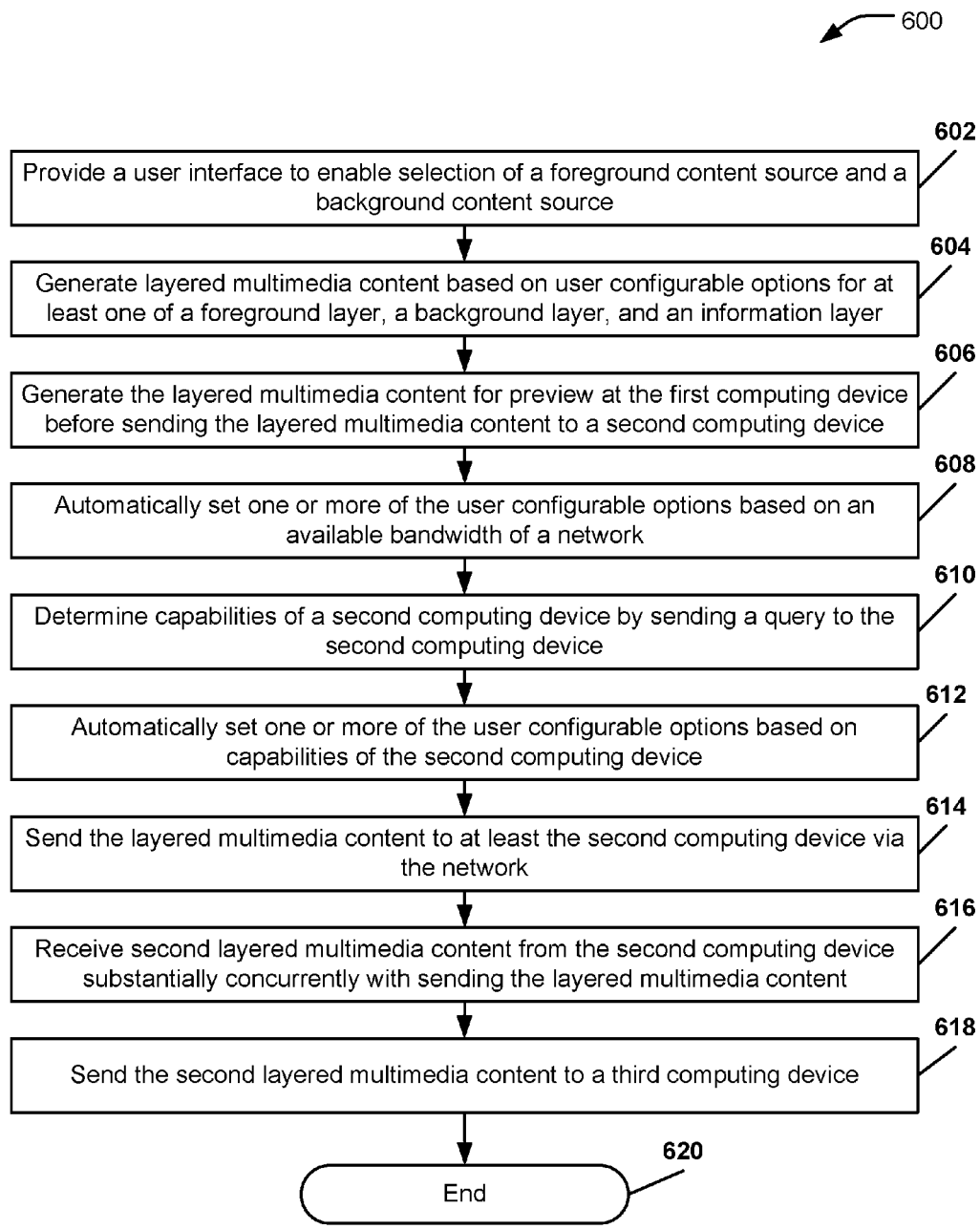
FIG. 6 is a flow diagram of a second particular embodiment of a method to generate layered multimedia content.

Referring to FIG. 6, a flow diagram of a second particular embodiment of a method to generate layered multimedia content is depicted and generally designated 600. The method may be performed by a computing device, such as the computing devices 102, 104, and 108 of FIG. 1, the computing device 202 of FIG. 2, the computing devices 302, 304, and 308 of FIG. 3, the user device 402 of FIG. 4, and the server 404 of FIG. 4.

The method begins when a user interface is provided to enable selection of a foreground content source and a background content source, at 602. Moving to 604, layered multimedia content is generated based on user configurable options for at least one of a foreground layer, a background layer, and an information layer. Advancing to 606, the layered multimedia content may be generated for preview at a first computing device before sending the layered multimedia content to a second computing device. For example, in FIG. 1, the user interface 174 may be generated by the user interface module 120 to enable a user to select foreground options 171 and background options 172. The layered multimedia content 180 may be generated for preview at the display device 170 before being sent to the second computing device 108.

Proceeding to 608, one or more of the user configurable options may be automatically set based on an available bandwidth of a network. For example, in FIG. 3, when the available bandwidth 307 satisfies a particular threshold, the first computing device 302 may automatically set the user configurable options 324 to reduce a bandwidth usage of the first layered multimedia content 350 based on the available bandwidth 307. Continuing to 610, capabilities of the second computing device may be determined by sending a query to the second computing device and one or more of the user configurable options may be automatically set based on the capabilities of the second computing device, at 612. For example, in FIG. 3, the processor 341 may execute the auto set module 344 and set the user configurable options 324 based the available bandwidth 307 of the network 306, the capabilities 330 of the second computing device 308, or any combination thereof.

Moving to 614, the layered multimedia content may be sent to at least the second computing device via the network. Proceeding to 616, second layered multimedia content may be received from the second computing device at the first computing device substantially concurrently with sending the layered multimedia content from the first computing device to the second computing device (e.g., during a chat or a teleconference session). For example, in FIG. 3, the first computing device 302 may send the first layered multimedia content 350 to the second computing device 308 substantially concurrently with receiving the second layered multimedia content 355 from the second computing device 308. Advancing to 618, the second layered multimedia content may be sent to a third computing device, and the method may end at 620. For example, in FIG. 3, the first computing device 302, the second computing device 308, and the third computing device 308 may be involved in a three-way video call.

Thus, a user can specify user configurable options to generate layered multimedia content that includes a foreground layer, a background layer, and an information layer. One or more of the user configurable options may be set automatically based on an available bandwidth of a network, capabilities of a second computing device, or any combination thereof.

Figure 7:
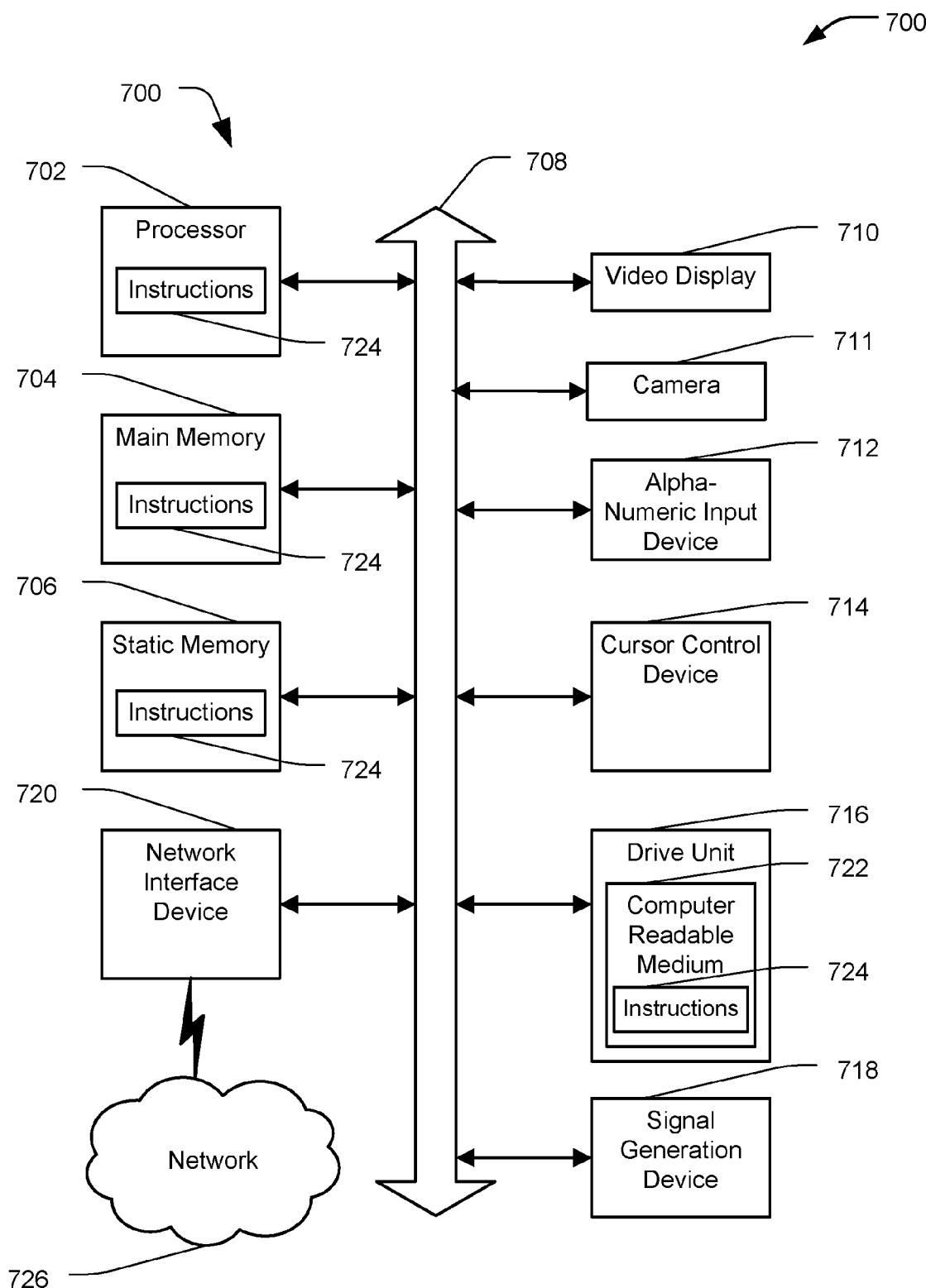
FIG. 7 is a block diagram of an illustrative embodiment of a general computer system.

Referring to FIG. 7, an illustrative embodiment of a general computer system is shown and is designated 700. The computer system 700 can include a set of instructions that are executable to cause the computer system 700 to perform any one or more of the methods or computer based functions disclosed herein. The computer system 700, or any portion thereof, may operate as a standalone device or may be connected, e.g., using a network, to other computer systems or peripheral devices.

In a networked deployment, the computer system 700 may operate in the capacity of any one or more of the computing devices 102, 104, and 108 of FIG. 1, the computing device 202 of FIG. 2, the computing devices 302, 304, and 308 of FIG. 3, the user device 402 of FIG. 4, and the server 404 of FIG. 4. The computer system 700 can also be implemented as or incorporated into various devices, such as a personal computer (PC), a tablet PC, a personal digital assistant (PDA), a mobile device, a palmtop computer, a laptop computer, a desktop computer, a communications device, a wireless telephone, a personal trusted device, a web appliance, or any other machine capable of executing a set of instructions (sequential or otherwise) that specify actions to be taken by that machine. In a particular embodiment, the computer system 700 can be implemented using electronic devices that provide voice, video or data communication. Further, while a single computer system 700 is illustrated, the term "system" shall also be taken to include any collection of systems or sub-systems that individually or jointly execute a set, or multiple sets, of instructions to perform one or more computer functions.

As illustrated in FIG. 7, the computer system 700 may include a processor 702, e.g., a central processing unit (CPU), a graphics-processing unit (GPU), or both. Moreover, the computer system 700 can include a main memory 704 and a static memory 706 that can communicate with each other via a bus 708. As shown, the computer system 700 may further include a video display 710, such as a liquid crystal display (LCD), an organic light emitting diode (OLED), a flat panel display, or a solid-state display. The computer system 700 may include one or more cameras, such as the representative camera 711 to provide a live video stream. Additionally, the computer system 700 may include an input device 712, such as a keyboard, and a cursor control device 714, such as a mouse. The computer system 700 can also include a disk drive unit 716, a signal generation device 718, such as a speaker or remote control, and a network interface device 720.

In a particular embodiment, as depicted in FIG. 7, the disk drive unit 716 may include a computer-readable medium 722 in which one or more sets of instructions 724, e.g. software, can be embedded. Further, the instructions 724 may embody one or more of the methods or logic as described herein. In a particular embodiment, the instructions 724 may reside completely, or at least partially, within the main memory 704, the static memory 706, and/or within the processor 702 during execution by the computer system 700. The main memory 704 and the processor 702 also may include computer-readable media.

In an alternative embodiment, dedicated hardware implementations, such as application specific integrated circuits, programmable logic arrays and other hardware devices, can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

In accordance with various embodiments of the present disclosure, the methods described herein may be implemented by software programs executable by the computer system 700. Further, in an exemplary, non-limited embodiment, implementations can include distributed processing, component/object distributed processing, and parallel processing. Alternatively, virtual computer system processing can be constructed to implement one or more of the methods or functionality as described herein.

The present disclosure contemplates a tangible, non-transitory computer-readable medium that includes instructions 724 or receives and executes instructions 724, so that a device connected to a network 726 can communicate voice, video or data over the network 726. Further, the instructions 724 may be transmitted or received over the network 726 via the network interface device 720.

While the computer-readable medium is shown to be a single medium, the term "computer-readable medium" includes a single medium or multiple non-transitory media, such as a centralized or distributed database, and/or associated caches and servers that store one or more sets of instructions. The term "computer-readable medium" shall also include any tangible storage medium that is capable of storing, encoding or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device. Accordingly, the disclosure is considered to include any one or more of a computer-readable medium and other equivalents and successor media, in which data or instructions may be stored.

In accordance with various embodiments, the methods described herein may be implemented as one or more software programs running on a computer processor. Dedicated hardware implementations including, but not limited to, application specific integrated circuits, programmable logic arrays and other hardware devices can likewise be constructed to implement the methods described herein. Furthermore, alternative software implementations including, but not limited to, distributed processing or component/object distributed processing, parallel processing, or virtual machine processing can also be constructed to implement the methods described herein.

It should also be noted that software that implements the disclosed methods may optionally be stored on a tangible storage medium, such as: a magnetic medium, such as a disk or tape; a magneto-optical or optical medium, such as a disk; or a solid state medium, such as a memory card or other package that houses one or more read-only (non-volatile) memories, random access memories, or other re-writable (volatile) memories. The software may also utilize a signal including computer instructions.

Although the present specification describes components and functions that may be implemented in particular embodiments with reference to particular standards and protocols, the invention is not limited to such standards and protocols. For example, standards for Internet and other packet switched network transmission and video transmission (e.g., CDMA, GSM, UMTS, WiMax, 802.11x, TCP/IP, UDP/IP, HTML, MPEG, SMPTE, and H.264) represent examples of the state of the art. Such standards are periodically superseded by faster or more efficient equivalents having essentially the same functions. Accordingly, replacement standards and protocols having the same or similar functions as those disclosed herein are considered equivalents thereof.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Accordingly, the disclosure and the figures are to be regarded as illustrative rather than restrictive.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

In the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The above-disclosed subject matter is to be considered illustrative, and not restrictive, and the appended claims are intended to cover all such modifications, enhancements, and other embodiments, which fall within the scope of the present disclosure. Thus, to the maximum extent allowed by law, the scope of the disclosure is to be determined by the broadest permissible interpretation of the following claims and their equivalents, and shall not be restricted or limited by the foregoing detailed description.

What is claimed is:

1. A method, comprising:
 sending a query from a first computing device to a second computing device to request a first capability of the second computing device;
 responsive to the query, receiving, at the first computing device, data indicating the first capability of the second computing device;
 setting, at the first computing device, a first configurable option based on the first capability of the second computing device, a second capability associated with a bandwidth of a network, or a combination thereof, wherein a first bit rate of a foreground layer is determined based on the first configurable option;

setting, at the first computing device, a second configurable option based on the first capabilities, the second capabilities, or a combination thereof, wherein a second bit rate of a background layer is determined based on the second configurable option;

receiving, at the first computing device, image content from a first content source of the first computing device;

identifying a foreground portion of the image content and a background portion of the image content;

identifying a location of the first computing device;

responsive to the location corresponding to a particular location, generating a user interface identifying a plurality of image content from a second content source, the particular location associated with second image content of the plurality of image content, the plurality of image content including third image content that is location independent, the second content source remote from the first content source, wherein the user interface is configured to receive user input selecting particular image content of the plurality of image content;

responsive to receiving the user input selecting the particular image content, generating, at the first computing device based on the first configurable option, layered multimedia content, wherein the layered multimedia content comprises the foreground layer and the background layer, the background layer including the background portion of the image content and the foreground layer including the particular image content; and sending, based on the second configurable option, the layered multimedia content to the second computing device via the network, the second computing device remote from the second content source.

2. The method of claim 1, wherein the image content includes live video content captured by a video capture device of the first computing device.

3. The method of claim 2, wherein the second image content includes graphical content generated by the second content source.

4. The method of claim 1, wherein the second content source includes a server storing a plurality of image content.

5. The method of claim 1, wherein the layered multimedia content further comprises a third layer based on the location.

6. The method of claim 5, further comprising determining description data associated with the location, wherein the description data represents textual information that is descriptive of the location or identifies a point of interest near the location.

7. The method of claim 1, further comprising receiving second layered multimedia content from a third computing device substantially concurrently with sending the layered multimedia content, wherein the second layered multimedia content comprises a third layer and a fourth layer, wherein the third layer originates from the second computing device, and wherein the second layered multimedia content is generated at the third computing device.

8. The method of claim 1, wherein the foreground portion is further identified using an edge detection algorithm.

9. The method of claim 1, wherein the foreground portion is identified using a face detection algorithm.

10. The method of claim 1, further comprising selecting the first content source from a set of available content sources based on a capability of the second computing device.

11. The method of claim 10, wherein the capability corresponds to a maximum capability of the second computing device independent of user input.

12. A computer-readable storage device storing instructions that, when executed by a processor, cause the processor to perform operations comprising:

sending a query from a first computing device to a second computing device to request a first capability of the second computing device;

responsive to the query, receiving data indicating the first capability of the second computing device;

setting a first configurable option based on the first capability of the second computing device, a second capability associated with a bandwidth of a network, or a combination thereof, wherein a first bit rate of a foreground layer is determined based on the first configurable option;

setting a second configurable option based on the first capabilities, the second capabilities, or a combination thereof, wherein a second bit rate of a background layer is determined based on the second configurable option;

receiving image content from a first content source of the first computing device;

identifying a foreground portion of the image content and a background portion of the image content;

identifying a location of the first computing device;

responsive to the location corresponding to a particular location, generating a user interface identifying a plurality of image content from a second content source, the particular location associated with second image content of the plurality of image content, the plurality of image content including third image content that is location independent, the second content source remote from the first content source, wherein the user interface is configured to receive user input selecting particular image content of the plurality of image content;

responsive to receiving the user input selecting the particular image content, generating, based on the first configurable option, layered multimedia content comprising the foreground layer and the background layer, the background layer including the background portion of the image content and the foreground layer including the particular image content; and sending, based on the second configurable option, the layered multimedia content to the second computing device via the network, the second computing device remote from the second content source.

13. The computer-readable storage device of claim 12, wherein the image content includes live content captured by an image capture device of the first computing device.

14. The computer-readable storage device of claim 13, wherein the second image content includes graphical content generated by the second content source.

15. The computer-readable storage device of claim 12, wherein the operations further comprise:

sending a query to the second computing device to request a first capability of the second computing device;

responsive to the query, receiving data indicating the first capability of the second computing device; and setting a first configurable option based on the first capability of the second computing device, a second capability associated with a bandwidth of a network, or a combination thereof, wherein a first bit rate of the foreground layer is determined based on the first configurable option.

16. The computer-readable storage device of claim 12, wherein the second content source includes a third computing device remote from the first computing device and the second computing device.

17. The computer-readable storage device of claim 12, wherein the operations further comprise:
   displaying a preview at a display device coupled to the first computing device prior to sending the layered multimedia content to the second computing device; and
   sending second multimedia content to a third computing device.

18. The computer-readable storage device of claim 12, wherein the layered multimedia content is generated based on the second computing device having insufficient computing capabilities to generate the layered multimedia content.

19. A system, comprising:
   a processor; and
   a memory coupled to the processor, the memory including instructions executable by the processor perform operations comprising:
      sending a query to a computing device to request a first capability of the computing device;
      responsive to the query, receiving data indicating the first capability of the computing device;
      setting a first configurable option based on the first capability of the computing device, a second capability associated with a bandwidth of a network, or a combination thereof, wherein a first bit rate of a foreground layer is determined based on the first configurable option;
      setting a second configurable option based on the first capabilities, the second capabilities, or a combination thereof, wherein a second bit rate of a background layer is determined based on the second configurable option;
      receiving image content from a first content source;
      identifying a foreground portion of the image content and a background portion of the image content;
      identifying a location of the first content source;
      responsive to the location corresponding to a particular location, generating a user interface identifying a plurality of image content from a second content source, the particular location associated with second image content of the plurality of image content, the plurality of image content including third image content that is location independent, the second content source remote from the first content source, wherein the user interface is configured to receive user input selecting particular image content of the plurality of image content;
      responsive to receiving the user input selecting the particular image content, generating, based on the first configurable option, layered multimedia content comprising the foreground layer and the background layer, the background layer including the background portion of the image content and the foreground layer including the particular image content; and
      sending, based on the second configurable option, the layered multimedia content to the computing device remote from the second content source.

20. The system of claim 19, wherein the layered multimedia content is generated based on the computing device having insufficient computing capabilities to generate the layered multimedia content.

* * * * *